3,014,945
TRIPHOSPHINYL PHOSPHITES

Gail H. Birum, Dayton, Ohio, assignor to Monsanto Chemical Company, St. Louis, Mo., a corporation of Delaware
No Drawing. Filed July 5, 1960, Ser. No. 40,531
15 Claims. (Cl. 260—461)

The present invention relates to organic phosphorus compounds and more particularly provides a new and valuable class of compounds of triphosphinyl phosphites and the method of preparing the same.

According to the invention, there are provided tris-(phosphinylhydrocarbyl) phosphites by the reaction of phosphorus trichloride, a carbonylic compound and a triorgano, trivalent phosphorus ester substantially according to the scheme

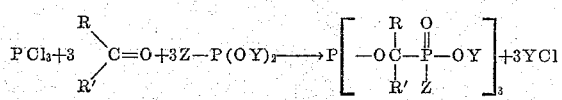

wherein R is selected from the class consisting of hydrogen and hydrocarbyl radicals of from 1 to 8 carbon atoms, R' is selected from the class consisting of hydrogen and the methyl radical and is the methyl radical only when R is an alkyl radical of from 1 to 2 carbon atoms, Y is selected from the class consisting of alkyl and haloalkyl radicals of from 1 to 8 carbon atoms, and Z is selected from the class consisting of —OY and hydrocarbyl radicals of from 1 to 8 carbon atoms which are free of aliphatic unsaturation.

The carbonylic compound may be an aldehyde or a lower aliphatic ketone, i.e., acetone and ethyl methyl ketone. The presently useful aldehydes are formaldehyde and hydrocarbon carboxaldehydes of from 2 to 9 carbon atoms. They include, in addition to formaldehyde, the aliphatic carboxaldehydes such as acetaldehyde, propionaldehyde, acrolein, methacrylaldehyde, propiolaldehyde, n-butyraldehyde, isobutyraldehyde, crotonaldehyde, tetrolaldehyde, valeraldehyde, isovaleraldehyde, citronellol, n-hexanal, n-heptanal, 2-allyl-4-pentenal, 2-ethylhexanal, sorbaldehyde and n-octanal, 2-octynal, branched-chain nonanal derived from "Oxo" process nonanol, etc.; aromatic aldehydes such as benzaldehyde, α- or β-naphthaldehyde, o-, m- or p-tolualdehyde, phenylacetaldehyde and o-, m- or p-ethylbenzaldehyde; and the cycloparaffinic aldehydes, such as cyclohexanecarboxaldehyde, 2-cyclohexene-1-carboxaldehyde, cyclohexadienecrotonaldehyde or 2-methylcyclopentanecarboxaldehyde, etc.

Triorgano, trivalent phosphorus esters useful for the present purpose are the phosphites and the phosphonites, e.g., the simple trialkyl phosphites, such as trimethyl, triethyl, triisopropyl, tri-n-butyl, triamyl, tri-(2-ethylhexyl), or tri-n-octyl phosphite; the mixed trialkyl phosphites such as dimethyl ethyl, diamyl propyl, ethyl methyl propyl, or isooctyl dimethyl phosphite; the simple haloalkyl phosphites, such as tris(2-chloroethyl), tris(2-chloropropyl), tris(2-bromopropyl), tris(dichlorooctyl), tris(2-fluoroethyl), and tris(2-bromo-3- chloropropyl) phosphite; the mixed haloalkyl phosphites, such as 2-chloroethyl bis(3-bromopropyl) phosphite or 2-chloroethyl 4-bromobutyl 2-chloropropyl phosphite; mixed phosphites of both paraffinic and haloparaffinic alcohols such as bis(2-chloroethyl) methyl phosphite or 2-chloropropyl diethyl phosphite; phosphonites such as diethyl methylphosphonite, bis(2-chloroethyl) ethylphosphonite, dimethyl pentylphosphonite, dibutyl isopropylphosphonite, ethyl methyl butylphosphonite, bis(2,3-dichloropropyl) 2-ethylhexylphosphonite, di-tert-butyl hexylphosphonite, bis(4-iodobutyl) ethylphosphonite, dipentyl, n-octylphosphonite, diheptyl heptylphosphonite, dioctyl ethylphosphonite, bis-(tetrabromobutyl) butylphosphonite, bis(2-fluoroethyl) propylphosphonite, dimethyl or diethyl or bis(2-ethylhexyl) phenylphosphonite, bis(2-chloroethyl) or bis(2,3-diiodopropyl) or bis(4-fluorobutyl) or bis(hexachlorooctyl) phenylphosphonite, dipropyl or dihexyl or dibutyl p-tolylphosphonite, diethyl or bis(2-chloroethyl) or di-n-octyl 4-ethylphenylphosphonite, dimethyl or dihexyl or bis(2,3-dichloropropyl) cyclopentyl- or cyclohexyl- or 2-methylcyclopentylphosphonite, etc.

When the aldehyde employed with the phosphorus trichloride and the triorgano phosphite is formaldehyde, the presently provided products are either tris[(dialkoxyphosphinyl)methyl] or tris{[bis(haloalkoxy)phosphinyl]methyl} phosphites, depending upon whether a trialkyl phosphite or a tris(haloalkyl) phosphite is employed. When the triorgano phosphorus ester is a phosphonite and the aldehyde is formaldehyde, the products are tris[(alkoxyhydrocarbylphosphinyl)methyl] phosphites or such compounds in which the alkoxy radical is halogen-substituted. Thus, reaction of phosphorus trichloride, formaldehyde and trimethyl phosphite gives tris[(dimethoxyphosphinyl)-methyl] phosphite; reaction of phosphorus trichloride, formaldehyde and tris(2-chloroethyl) phosphite gives tris{[bis(haloalkoxy)phosphinyl]methyl} phosphite; and reaction of phosphorus trichloride, formaldehyde and dimethyl butylphosphonite gives tris[(methoxybutylphosphinyl)methyl] phosphite.

Alkanecarboxaldehydes with phosphorus trichloride and a trialkyl phosphite yield tris[1-(dialkoxyphosphinyl)-alkyl] phosphites, i.e., compounds of the formula

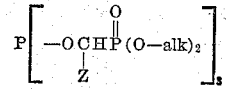

where Z is an alkyl radical of from 1 to 8 carbon atoms and alk denotes an alkyl radical of from 1 to 8 carbon atoms. Thus, reaction of phosphorus trichloride with acetaldehyde and tri-n-butyl phosphite gives tris[1-(di-n-butoxyphosphinyl)ethyl] phosphite, i.e., a compound of the above formula in which Z is methyl and alk is n-butyl. Other compounds of the above formula which are provided by the invention are, e.g., tris[1-(dimethoxyphosphinyl)ethyl] phosphite
tris[1-(dimethoxyphosphinyl)propyl] phosphite
tris[1-(di-n-octyloxyphosphinyl) - 2 - methylpropyl] phosphite
tris[1-(diethoxyphosphinyl)butyl] phosphite
tris[1-(di-n-butoxyphosphinyl)hexyl] phosphite
tris[1-(dimethoxyphosphinyl)-2-ethylhexyl] phosphite
tris[1-(di-n-hexyloxyphosphinyl)ethyl] phosphite
tris[1-(diisoamyloxyphosphinyl)propyl] phosphite
tris[1-(di-n-propoxyphosphinyl)heptyl] phosphite
tris{1 - [bis(2 - ethylhexyloxy)phosphinyl] - 2 - methylpropyl} phosphite Tris(haloalkyl) phosphites react with phosphorus trichloride and an alkanecarboxaldehyde to give tris{1-[bis(haloalkoxy)phosphinyl]alkyl}phosphites. Thus, reaction of tris(2-chloroethyl) phosphite with propionaldehyde and phosphorus trichloride gives tris{1-[bis(2-chloroethoxy)phosphinyl]propyl}phosphite; tris (2-chloropropyl) phosphite, phosphorus trichloride and acetaldehyde yield tris{1 - [bis(2 - chloropropoxy)phosphinyl]-ethyl}phosphite; tris(tetrachlorohexyl) phosphite, phosphorus trichloride and butyraldehyde give tris{1-[bis(tetrachlorohexyloxy)phosphinyl]butyl}phosphite; tris(2-fluoroethyl) phosphite, 2-ethylhexanal and phosphorus trichloride give tris{1-[bis(2-fluoroethoxy)phosphinyl] - 2 - ethylhexyl} phosphite; tris(dibromooctyl) phosphite, valeraldehyde and phosphorus trichloride give tris{1-[bis(dibromooctyloxy) phosphinyl]pentyl}phosphite; and tris(2-iodoethyl) phosphite, propionaldehyde and phosphorus trichloride give tris{1-[bis(2 - iodoethoxy)phosphinyl]propyl}phosphite.

When the aldehyde is benzaldehyde, the products with phosphorus trichloride and a trialkyl phosphite are tris[α-(dialkoxyphosphinyl)benzyl] phosphites, i.e., they have the formula

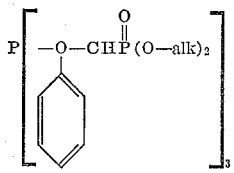

wherein alk is an alkyl radical of from 1 to 8 carbon atoms, e.g., tris[α-(dimethoxyphosphinyl)benzyl] phosphite;
tris[α-(diethoxyphosphinyl)benzyl] phosphite;
tris[α-(diisopropoxyphosphinyl)benzyl] phosphite;
tris[α-(di-n-butoxyphosphinyl)benzyl] phosphite;
tris[α-(di-n-amyloxyphosphinyl)benzyl] phosphite; and
tris[α-(diisooctyloxyphosphinyl)benzyl] phosphite.

When benzaldehyde and phosphorus trichloride are employed with a tris(haloalkyl) phosphite, there are obtained, e.g., tris{α-[bis(2-chloropropoxy)phosphinyl]benzyl}phosphite; tris{α-[bis(2-chloroethoxy)phosphinyl]benzyl}phosphite, or tris{α-[bis(3-bromopropoxy)phosphinyl]benzyl}phosphite, depending upon whether there is employed tris(2-chloropropyl), tris(2-chloroethyl) or tris(3-bromopropyl) phosphite, respectively.

Examples of presently provided phosphinyl phosphites which are obtained from benzenoid aldehydes other than benzaldehyde are tris[1-(diethoxyphosphinyl)-2-phenylethyl] phosphite which is prepared from phenylacetaldehyde, triethyl phosphite and phosphorus trichloride; tris[1-(di-n-octyloxyphosphinyl) - 3 - phenylpropyl] phosphite which is obtained from β-phenylpropionaldehyde, tri-n-octyl phosphite and phosphorus trichloride; tris{1-[bis(3-bromopropoxy)phosphinyl] - 2 - phenylethyl}phosphite which is prepared from phenylacetaldehyde, tris(3-bromopropyl) phosphite and phosphorus trichloride; tris[α - (di-n-butoxyphosphinyl)-4-methylbenzyl] phosphite which is prepared from p-tolualdehyde, tri-n-butyl phosphite and phosphorus trichloride; tris{α-[bis(2-chloroethoxy)phosphinyl] - 2 - methylbenzyl}phosphite which is obtained from o-tolualdehyde, tris(2-chloroethyl) phosphite and phosphorus trichloride; tris [α-(dihexyloxyphosphinyl)-2,3-dimethylbenzyl] phosphite which is prepared from 2,3-dimethylbenzaldehyde, trihexyl phosphite and phosphorus trichloride; tris[α - (diethoxyphosphinyl)-4-ethylbenzyl] phosphite which is prepared from 4-ethylbenzaldehyde, triethyl phosphite and phosphorus trichloride; and tris{α-[bis(chlorooctyloxy)phosphinyl] - 2 - ethylbenzyl}phosphite which is prepared from 2-ethylbenzaldehyde, tris(chlorooctyl) phosphite and phosphorus trichloride.

Cycloalkanecarboxaldehydes give with phosphorus trichloride and trialkyl phosphite compounds such as tris[α - (diethoxyphosphinyl)cyclohexylmethyl] phosphite which is obtained from cyclohexanecarboxaldehyde, triethyl phosphite and phosphorus trichloride; and tris{α-[bis(3 - chloropropoxy)phosphinyl]cyclopentylmethyl} phosphite which is obtained from cyclopentanecarboxaldehyde, tris(3-chloropropyl) phosphite and phosphorus trichloride.

The products obtained from unsaturated aldehydes, rather than from the saturated or benzenoid aldehydes shown above are analogous; they differ only in that the unsaturation is retained in that portion of the product which is derived from the carboxaldehyde, i.e., the presence or absence of one or more olefinic or acetylenic bonds has no effect on the course of the invention. Thus, phosphorus trichloride reacted with acrolein and triethyl phosphite or with tris(2,3-dichloropropyl) phosphite gives tris[(diethoxyphosphinyl) - 2 - propenyl] phosphite or tris{[bis(2,3 - dichloropropoxy)phosphinyl] - 2 - propenyl}phosphite; the trichloride reacted with crotonaldehyde and trimethyl phosphite gives tris[(dimethoxyphosphinyl)-2-butenyl] phosphite; the chloride reacted with cinnamaldehyde and tributyl phosphite gives tris[(dibutoxyphosphinyl)-3-phenyl-2-propenyl] phosphite, and the trichloride reacted with 2-cyclohexenecarboxaldehyde and trioctyl phosphite gives tris[(dioctyloxyphosphinyl) - 2 - cycloxenylmethyl] phosphite.

As herein disclosed, the lower dialkyl ketones such as acetone or ethyl methyl ketone react as do the hydrocarbyl aldehydes in preparing the phosphinyl phosphites. Products thus obtained with trialkyl phosphites and phosphorus trichloride have the formula

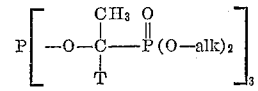

where T is a hydrocarbon radical of from 1 to 2 carbon atoms and alk denotes an alkyl radical of from 1 to 8 carbon atoms. Thus, acetone, trimethyl phosphite and phosphorus trichloride give tris[2-(dimethoxyphosphinyl)-2-propyl] phosphite, i.e., a compound in which both T and alk are methyl; ethyl methyl ketone, triethyl phosphite and phosphorus trichloride yield tris[2-(diethoxyphosphinyl)-2-butyl] phosphite; and acetone, tris(2-ethylhexyl) phosphite and phosphorus trichloride yield tris{2-[bis(2-ethylhexyloxy)phosphinyl] - 2 - propyl}phosphite. Employing a tris(haloalkyl) phosphite instead of the trialkyl phosphite, there are obtained, e.g., tris{2-[bis(2-chloroethoxy)phosphinyl] - 2 - propyl}phosphite from acetone, tris(2-chloroethyl) phosphite and phosphorus trichloride and tris{2-[bis(2-bromopropyl)phosphinyl] - 2-butyl} phosphite from ethyl methyl ketone, tris(2-bromopropyl) phosphite and phosphorus trichloride.

As stated above, the dialkyl or bis(haloalkyl) esters of the hydrocarbylphosphonic acids react as do the phosphites with phosphorus trichloride and a carboxaldehyde or a lower ketone. The compounds thus obtained when the aldehyde is formaldehyde are either tris[1-(alkoxyhydrocarbylphosphinyl)-methyl] phosphites or tris{1-[(haloalkoxy)hydrocarbylphosphinyl] - methyl} phosphites, depending upon whether the dialkyl or haloalkyl ester is used. When the aldehyde component is a hydrocarboncarboxaldehyde, the product with phosphorus trichloride and a dialkyl or bis(haloalkyl) hydrocarbylphosphonite are either tris[1-(alkoxyhydrocarbylphosphinyl)hydrocarbyl] phosphites or tris{1-(haloalkoxy)hydrocarbylphosphinyl]hydrocarbyl} phosphites. Thus, reaction of phosphorus trichloride, formaldehyde and dibutyl ethylphosphonite gives tris[1-(butoxyethylphosphinyl)methyl] phosphite, and employing instead of said dibutyl ester, a bis(haloalkyl) ester such as bis(2,3-dichloropropyl) phenylphosphonite there is prepared tris{1-(2,3-dichloropropoxy)phenylphosphinyl]-methyl} phosphite. Reaction of a hydrocarboncarboxaldehyde, e.g., acetaldehyde, with phosphorus trichloride and a dialkyl hydrocarbylphosphonite such as dimethyl butylphosphonite gives tris[1-(methoxybutylphosphinyl)propyl] phosphite, and employing benzaldehyde with phosphorus trichloride and bis(2-chloroethyl) α-naphthylphosphonite there is obtained tris{α-[(2-chloroethoxy)-α-naphthylphosphinyl]benzyl} phosphite. It will be noted that the phosphinyl radical is substituted by the one of the ester groups of the phosphonite and by the hydrocarbyl radical of the phosphonite, and that the thus substituted phosphinyl radical is attached to the oxygen-free residue of the aldehyde. Compounds prepared from phosphorus trichloride, a hydrocarbon carboxaldehyde and a dialkyl hydrocarbylphosphonite have the general formula

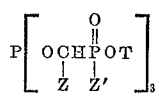

where Z and Z' are each hydrocarbyl radicals of from 1 to 8 carbon atoms and are free of aliphatic unsaturation, and T is an alkyl radical of from 1 to 8 carbon atoms. Examples of compounds of the above formula, other than those mentioned above, are given in the following table:

| Z= | Z'= | T= |
| --- | --- | --- |
| methyl | ethyl | ethyl. |
| phenyl | butyl | propyl. |
| cyclopentyl | benzyl | octyl. |
| vinyl | cyclohexyl | pentyl. |
| β-naphthyl | p-tolyl | butyl. |
| 2-propinyl | pentyl | 2-ethylhexyl. |
| 2-cyclohexenyl | octyl | isopropyl. |
| 2-phenylvinyl | cyclopropyl | heptyl. |
| octyl | methyl | pentyl. |

The lower aliphatic ketones react as do the aldehydes in the reaction with phosphorus trichloride and a dialkyl or bis(haloalkyl) hydrocarbylphosphonite. The products thus obtained have the formula

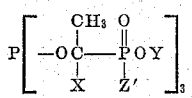

where X is an alkyl radical of from 1 to 2 carbon atoms, Z' is a hydrocarbyl radical of 1 to 8 carbon atoms which is free of aliphatic unsaturation and Y is selected from the class of alkyl and haloalkyl radicals of from 1 to 8 carbon atoms. The products thus obtained are tris[2-(alkoxyhydrocarbylphosphinyl)alkyl] phosphites when Y is an alkyl radical. For example, the reaction product of phosphorus trichloride, acetone and dimethyl phenylphosphonite is tris[2-(methoxyphenylphosphinyl)propyl] phosphite and that obtained from phosphorus trichloride, ethyl methyl ketone and bis(2-bromoethyl) butylphosphonite is tris{2 - [(2 - bromoethoxy)butylphosphinyl] butyl} phosphite.

Reaction of phosphorus trichloride with the carbonylic compound and the triorgano phosphorus ester is effected by simply mixing the three reactants at ordinary, decreased, or increased temperature and allowing the resulting reaction mixture to stand until formation of the triphosphinyl phosphite. Thus, the phosphorus ester may be mixed with phosphorus trichloride and the aldehyde or ketone added to the resulting mixture, or the aldehyde or ketone and said ester may first be mixed and the phosphorus trichloride added thereto. Because the reaction is usually exothermic, gradual contact of the reactants is generally recommended in order to obtain smooth reaction. However, as will be apparent to those skilled in the art, the exothermal nature of the reaction becomes less of a factor as the molecular weight of the reactants, and particularly of said ester, is increased. Also, when the aldehyde is either a higher alkanecarboxaldehyde or an aralkyl or alkaryl aldehyde, reaction is generally not so rapid as it is with the lower aliphatic aldehydes or with benzaldehyde. It is thus recommended that in each initial run, the three reactants be mixed gradually at low temperatures and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction, in any event, can be readily ascertained by noting cessation in change of viscosity, refractive index, or the quantity of by-product alkyl or haloalkyl halide. Reaction of the three components takes place readily in the absence of an inert diluent or catalyst. However, catalysts and diluents or solvents may be employed. The use of diluents may be particularly advantageous when working with the more reactive aldehydes; such diluents may be, e.g., benzene, toluene, dioxane, methylene chloride or hexane. When employing no diluent and using substantially the stoichiometric proportion of reactants, i.e., one molar equivalent of phosphorus trichloride, substantially three molar equivalents of the carbonylic compound and substantially three molar equivalents of the triorgano phosphorus ester, the reaction product may be used directly for a variety of industrial and agricultural purposes without purification, i.e., it consists essentially of the triphosphinyl phosphite dissolved in the alkyl chloride or alkylene dichloride which is produced as by-product. If desired, however, the triphosphinyl phosphite may be readily separated from said by-product by volatilizing the latter to give the triphosphinyl compound as residue. If an excess of either the carbonyl compound or the phosphite is initially present, such an excess may also be separated from the product by distillation.

The triphosphinyl phosphites provided by the invention are stable, generally high-boiling compositions which range from viscous liquids to waxy and crystalline products. They may be advantageously used for a wide variety of industrial and agricultural purposes, e.g., as fungicides, insecticides and bacteriostats; as plasticizers for synthetic resins and plastics; as functional fluids in electrical and force-transmission applications; as rubber-compounding chemicals; and as lubricant additives. The tris{1-[bis(haloalkyloxy)phosphinyl]alkyl} phosphites are particularly valuable as flame-proofing agents for cellulosic and carbonaceous materials, generally. The presently provided compounds are generally useful as additives to gasoline and other hydrocarbon fuels containing organolead compounds. They serve as lead scavengers and suppress pre-ignition glow when incorporated into such fuels.

The invention is further illustrated by but not limited to the following examples:

*Example 1*

To an ice-cooled mixture of 34.6 g. (0.6 mole) of acetone and 83 g. (0.5 mole) of triethyl phosphite there was added, during 0.2 hour, 22.8 g. (0.166 mole) of phosphorus trichloride. After warming the whole to a maximum temperature of 92° C. and maintaining it at 90–92° C. for 0.5 hour, it was distilled to remove material boiling below a pot temperature of 108° C./0.7 mm. There was thus obtained as residue 97.2 g. (95% theoretical yield) of the substantially pure tris[2-(diethoxyphosphinyl)-2-propyl] phosphite, analyzing 40.39% carbon and 7.83% hydrogen as against 41.0% and 7.9%, the calculated values, and having the structure

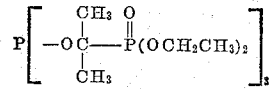

*Example 2*

To a mixture consisting of 265.2 g. (1.0 mole) of tris (2-chloroethyl) phosphite and 58 g. (1.0 mole) of propionaldehyde there was gradually added 45.8 g. (0.333 mole) of phosphorus trichloride. The exothermic reaction mixture was maintained at below 25° C. by ice-cooling. When all of the chloride had been added, the reaction mixture was warmed to 90° C., cooled to 40° C., placed under water-pump vacuum, and warmed to 81° C. to remove by-product 1,2-dichloroethane and any unreacted material. Concentration to a pot temperature of 150° C./1 mm., gave as residue 289.5 g., $n_D^{25}$ 1.4901, of the substantially pure tris{1-[bis(2-chloroethoxy)phosphinyl]propyl} phosphite of the structure

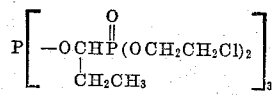

*Example 3*

To a mixture consisting of 68.7 g. of phosphorus trichloride and 445 g. of tris(2-chloroethyl) phosphite there was added, during a 20-minute period, 70 g. of acetaldehyde while maintaining the temperature of the reaction mixture at 8–20° C. The colorless reaction mixture was then warmed to 50° C., a 4 g. test sample was removed from the reaction mixture, and the remainder was concentrated to a pot temperature of 180° C./0.01 mm. By-product ethylene dichloride and excess tris(2-chloroethyl) phosphite collected in the Dry-Ice trap during concentration. There was thus obtained as residue 401.8 g. of the substantially pure, colorless, viscous tris{1-[bis(2-chloroethoxy)phosphinyl]ethyl} phosphite of the structure

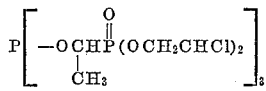

Example 4

To a mixture consisting of 150.5 g. (0.45 mole) of tri-n-hexyl phosphite and 47.8 g. (0.45 mole) of benzaldehyde there was added, during about 12 minutes, with cooling, 20.6 g. of phosphorus trichloride. When all of the aldehyde had been added and cooling discontinued, the temperature of the reaction mixture increased spontaneously to 52° C. The whole was then warmed to 90–100° C. for 30 minutes and subsequently allowed to stand overnight at room temperature. Concentration of the resulting reaction mixture to a pot temperature of 100° C./0.05 mm., gave 52.9 g. (97.5% of theory) of by-product n-hexyl chloride in the Dry-Ice trap which formed a part of the equipment and, as residue, 166.3 g. of the substantially pure, almost colorless, viscous tris [α-(di-n-hexyloxyphosphinyl)benzyl] phosphite of the structure

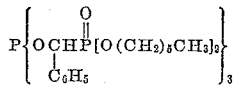

Example 5

To 124 g. (1.0 mole) of trimethyl phosphite there was added, during about 6 minutes, 45.2 g. (0.33 mole) of phosphorus trichloride. While cooling the reaction mixture in an ice bath, there was gradually added thereto, during 30 minutes at 15–18° C., 60 g. (1.07 mole) of redistilled acrolein. When the cooling bath was removed, the temperature increased exothermally to 33° C. Heat was then applied and it was warmed to 50° C. During this time a total of 45.0 g. of methyl chloride was collected in the Dry-Ice trap which formed a part of the reaction equipment. The reaction mixture was then placed under vacuum and warmed to 101° C./4 mm. There was thus obtained as residue 173.0 g. (100% of theory) of the substantially pure tris[1-(dimethoxyphosphinyl)-2-propenyl] phosphite, $n_D^{25}$ 1.4793, analyzing 33.57% carbon and 6.03% hydrogen as against 34.3% and 5.8%, the calculated values.

Example 6

To a cooled (10° C.) mixture consisting of 19.8 g. (0.1 mole) of diethyl phenylphosphonite and 4.6 g. (0.33 mole) of phosphorus trichloride there was added dropwise 4.4 g. (0.1 mole) of acetaldehyde. The temperature increased spontaneously to 29° C., so cooling was applied to maintain the temperature of the reaction mixture below 30° C. When all of the aldehyde had been added, the whole was heated to 75° C. to assure complete reaction and then subjected to water-pump pressure to remove by-product ethyl chloride and any unreacted aldehyde. The product was then concentrated to 80° C./3 mm. to give as residue the clear, colorless, viscous tris [1 - (ethoxyphenylphosphinyl) propyl] phosphite, $n_D^{25}$ 1.5409.

This application is a continuation-in-part of my copending application, Serial No. 780,202, filed December 15, 1958.

What I claim is:
1. A compound of the formula

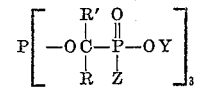

in which R is selected from the class consisting of hydrogen, alkyl radicals of from 1 to 8 carbon atoms, alkenyl radicals of from 2 to 8 carbon atoms, the phenyl radical and phenylalkyl and alkylphenyl radicals of 7 to 8 carbon atoms, R′ is selected from the class consisting of hydrogen and the methyl radical and is the methyl radical only when R is an alkyl radical of from 1 to 2 carbon atoms, Z is selected from the class consisting of —OY and alkyl and aryl radicals of from 1 to 8 carbon atoms and Y is selected from the class consisting of alkyl and haloalkyl radicals of from 1 to 8 carbon atoms.

2. A compound of the formula

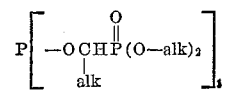

in which alk denotes an alkyl radical of from 1 to 8 carbon atoms.

3. A compound of the formula

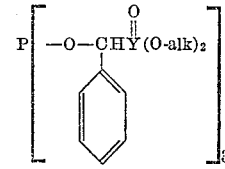

where alk is an alkyl radical of from 1 to 8 carbon atoms.

4. A compound of the formula

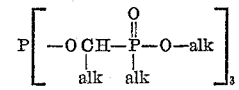

in which alk denotes an alkyl radical of from 1 to 8 carbon atoms.

5. A compound of the formula

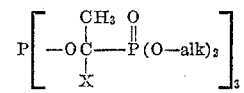

where X is an alkyl radical of from 1 to 2 carbon atoms and alk denotes an alkyl radical of from 1 to 8 carbon atoms.

6. A compound of the formula

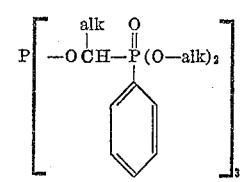

in which alk denotes an alkyl radical of from 1 to 8 carbon atoms.

7. A compound of the formula

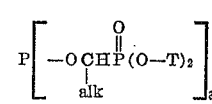

in which alk denotes an alkyl radical of from 1 to 8 carbon atoms and T denotes a haloalkyl radical of from 1 to 8 carbon atoms.

8. A compound of the formula

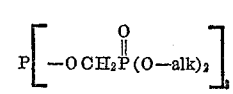

where alk denotes an alkyl radical of from 1 to 8 carbon atoms.

9. Tris[1-(methoxyphenylphosphinyl)propyl] phoshite.
10. Tris[1-(dimethoxyphosphinyl)-2-propenyl] phosphite.
11. Tris[2-(diethoxyphosphinyl)-2-propyl] phosphite.
12. Tris{1-[bis(2-chloroethoxy)phosphinyl]propyl} phosphite.
13. Tris{1-[bis(2-chloroethoxy)phosphinyl]ethyl} phosphite.
14. Tris[α-(di-n-hexyloxyphosphinyl)benzyl] phosphite.

15. A compound of the formula

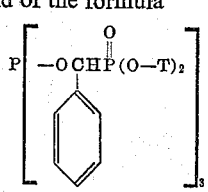

in which T denotes a haloalkyl radical of from 1 to 8 carbon atoms.

No references cited.

UNITED STATES PATENT OFFICE
CERTIFICATE OF CORRECTION

Patent No. 3,014,945                                December 26, 1961

Gail H. Birum

It is hereby certified that error appears in the above numbered patent requiring correction and that the said Letters Patent should read as corrected below.

Column 3, lines 7 to 13, the formula should appear as shown below instead of as in the patent:

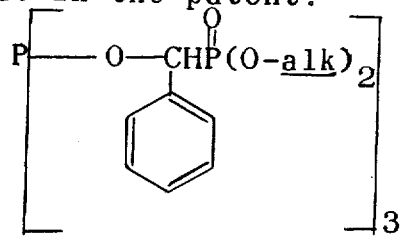

column 8, lines 26 to 33, the formula should appear as shown below instead of as in the patent:

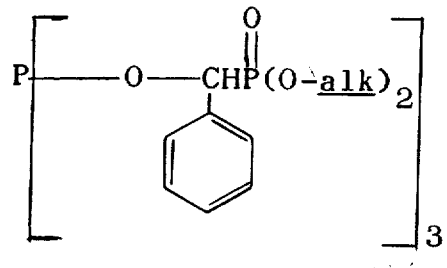

Signed and sealed this 27th day of November 1962.

(SEAL)
Attest: ESTON G. JOHNSON
~~ERNEST W. SWIDER~~
Attesting Officer

DAVID L. LADD
Commissioner of Patents